United States Patent
Gandy

[11] Patent Number: 5,906,400
[45] Date of Patent: May 25, 1999

[54] GALVANIC CORROSION PROTECTION SYSTEM

[75] Inventor: John Gandy, Conroe, Tex.

[73] Assignee: John Gandy Corporation, Conroe, Tex.

[21] Appl. No.: 08/854,767

[22] Filed: May 12, 1997

[51] Int. Cl.$^6$ .................................................. F16L 55/128
[52] U.S. Cl. .......................... 285/55; 285/329; 285/333; 285/422; 205/131
[58] Field of Search ............................. 285/329, 55, 383, 285/333, 422; 204/196, 197; 205/131; 138/DIG. 6

[56] References Cited

U.S. PATENT DOCUMENTS

| | | | |
|---|---|---|---|
| 3,186,738 | 6/1965 | Dalrymple | 285/55 |
| 3,202,562 | 8/1965 | Lang et al. | 285/55 |
| 3,620,555 | 11/1971 | Hinds | 285/55 |
| 4,176,033 | 11/1979 | Council | 204/197 |
| 4,345,785 | 8/1982 | Bradford | 285/50 |
| 4,366,971 | 1/1983 | Lula | 285/55 |
| 4,524,996 | 6/1985 | Hunt | 285/55 |
| 4,600,219 | 7/1986 | Yoshida | 285/329 |
| 5,069,485 | 12/1991 | Allen et al. | 285/55 |
| 5,320,388 | 6/1994 | Lacy et al. | 285/55 |

*Primary Examiner*—Eric K. Nicholson
*Attorney, Agent, or Firm*—Charles D. Gunter, Jr.

[57] ABSTRACT

A pipe couple is shown for connecting two pipelines of different materials together in a well environment which prevents deterioration of the pipe due to galvanic action. The couple achieves its purpose by coating the interior of the more noble pipe section with a wear-resistant, non-conductive coating which prevents electrolytic action between the two dissimilar metals. It also achieves high pullout resistance while maintaining minimum outer dimensions to facilitate use of the couple in all types of wells including oil, gas and waste injection wells.

8 Claims, 1 Drawing Sheet

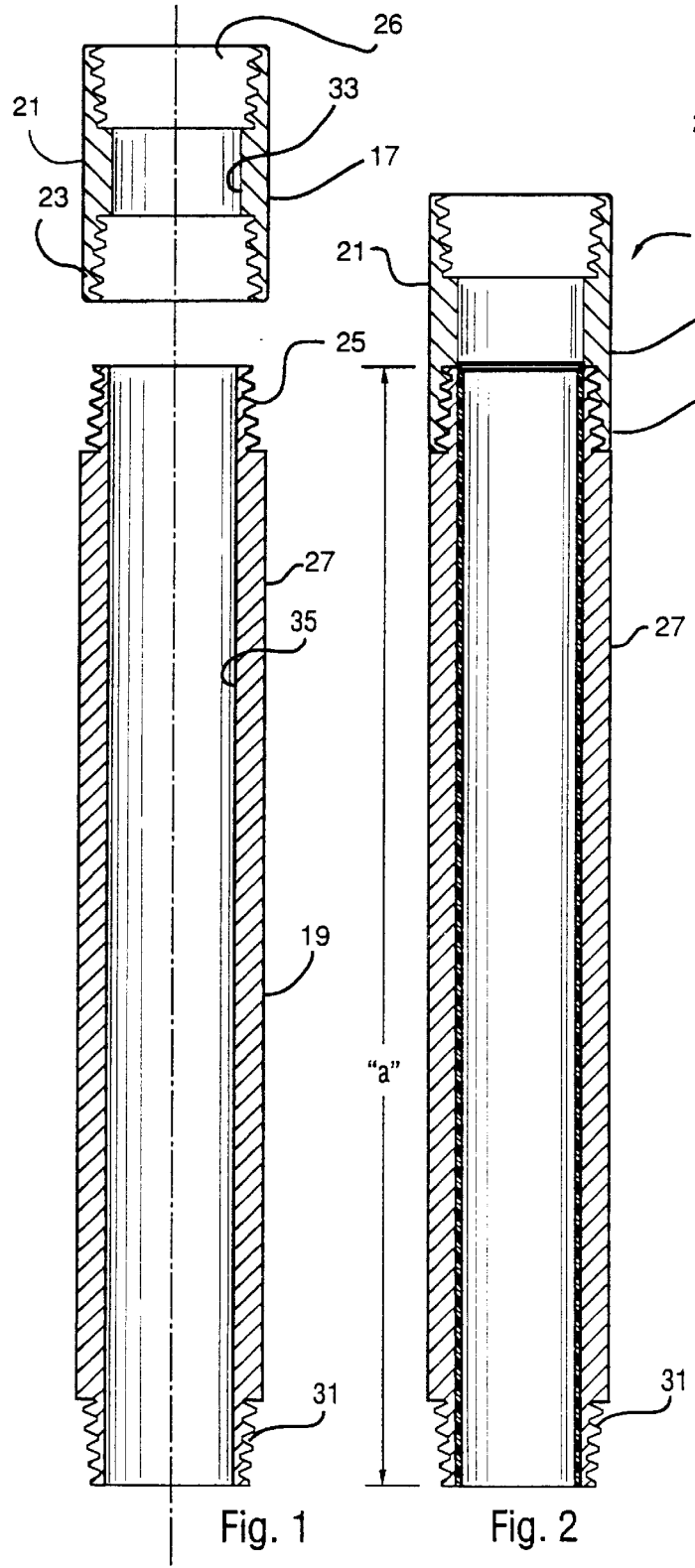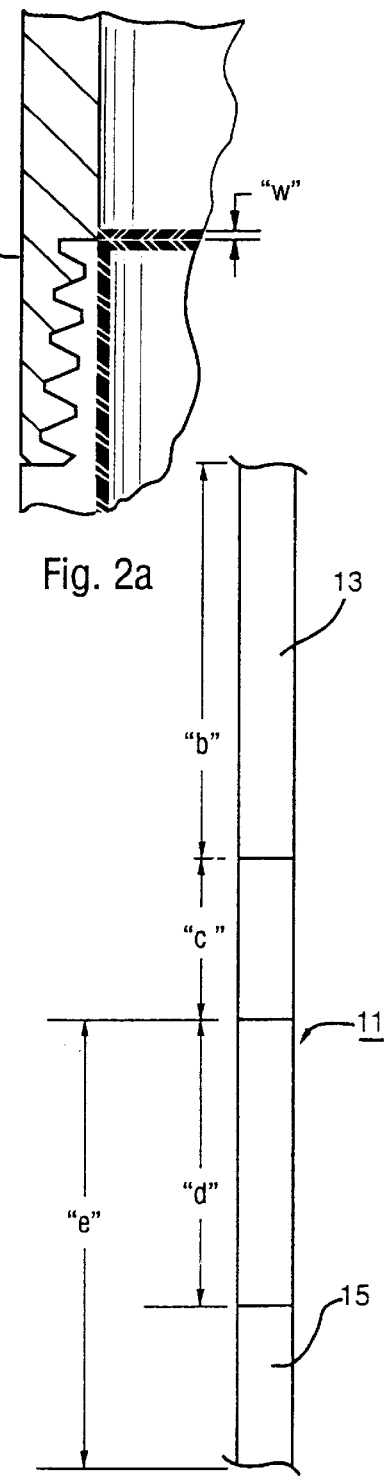
Fig. 1  Fig. 2  Fig. 2a  Fig. 3

GALVANIC CORROSION PROTECTION SYSTEM

BACKGROUND OF THE INVENTION

1. Field of the Invention

The present invention relates generally to a method for preventing galvanic corrosion of pipe and, more specifically, to a method for coupling carbon steel pipe to Corrosion Resistant Alloy (CRA) pipe, where the threads within the couple are protected in an oxygen free environment, the method also including the application of an abrasion resistant nonconductive coating to the surface of the CRA pipe, particularly where the pipe is used downhole and the couple is submerged in an electrolytic fluid.

2. Description of the Prior Art

For many years, the chemical, petrochemical, oil and gas, sulfur and related industries were faced with the problem of galvanic corrosion in underground wells and associated surface piping, which problem was intensified by electrolytic fluids encountered in normal well operations. Exposure of steel pipe, tubing and casing to fluids in this environment decreased the useful life of the materials and increased maintenance costs associated with the wells. A casing leak in a waste injection well could require installation of a repair liner or plugging of the well. In cases where an oil or gas well exhibited only marginal production, the increased maintenance cost could determine whether or not the well was kept in production.

Whenever two dissimilar metals are connected, a galvanic couple is created. This couple will result in corrosion of the anode, the less noble of the two metals making up the couple. The severity of the reaction between the two metals is determined by several factors including the electromotive nature of each metal and the galvanic potential difference between the two. Another primary factor is the environment surrounding the galvanic couple including the conductivity, temperature and oxygen concentrations within the well bore or other environment.

In order to reduce installation costs, some waste injection wells combine carbon steel with corrosion resistant alloy (CRA) casing, tubing and piping materials. The carbon steel material is utilized in the upper portion of the pipe string in the well above the injection interval and CRA is used for the lower portion from just above the packer to the base of the pipe string. The connection of the carbon steel to the CRA creates a galvanic couple. The resulting galvanic reaction accelerates corrosion of the carbon steel, leading to premature failure immediately adjacent the connection of the two dissimilar metals unless corrective action is taken.

Galvanic corrosion can be halted when the flow of electrical current from the cathode (CRA) to the anode (carbon steel) is eliminated. A common method of eliminating the current flow has been the use of a non-metallic section of pipe, such as fiberglass, between the carbon steel and the CRA. U.S. Pat. Nos. 2,950,928; 3,185,501 and 3,346,274 all show electrically insulating joints for connecting pipes, casing and tubing in a well pipe string. All of these connecting joints utilize at least one resilient insulating member to prevent physical contact between the pipes. This construction renders it impractical to use such a system in the high temperature or corrosive environment of many injection wells or oil or gas wells due to the rapid deterioration of the resilient element. Also, the inferior pullout strength of these joints would prohibit their use in most well strings or similar piping arrangements. Other insulating pipe couplings are shown, for example, in U.S. Pat. No. 3,871,687.

However, none of the above couplings are designed for use in high temperature or corrosive well environments. Thus, the use of a non-metallic section of pipe to halt galvanic corrosion has certain inherent drawbacks including the inability to maintain a seal in the connection between the non-metallic and metallic casing and the lack of durability while drilling out or running tools through the non-metallic pipe.

Another method which has been attempted for controlling galvanic corrosion is to apply a protective coating to the less noble or carbon steel pipe. This method is potentially worse than applying no coating to either section of pipe. There is a high probability that, either due to defect during the coating application or damage during installation, maintenance or operation of the well, a small area will become uncoated. The entire galvanic current projected from the CRA cathode to the carbon steel anode is then concentrated on the small, uncoated area accelerating corrosion at that location.

While the entire well pipe string can be formed of a CRA material such as stainless steel or other corrosion resistant material, this solution is generally uneconomical due to the much higher cost of such materials. Obviously, the more viable solution is to use the CRA material, such as stainless steel, only through the most corrosive area of the well operation and to join it to a string of carbon steel pipe which is used to make up the remainder of the pipe string. However, as discussed above, the corrosive fluids present in many well environments offer the ideal conditions for galvanic corrosion between the dissimilar metals. The result is a faster corrosive attack of the carbon steel piping and a slower attack of the stainless steel as compared with the same materials when they are not in contact.

A need exists, therefore, for a method to couple pipe which effectively protects two adjacent sections of pipe of dissimilar metals included in a string of well pipe.

A need also exists for such a method to couple pipe which is simple in design and economical to manufacture.

Another object of the invention is to provide such a method to couple pipe as well as an internal coating system for use in electrolytic environments which is capable of withstanding the abrasive forces associated with the operation of drilling and downhole tools within the pipe string without significant loss of coating area while containing galvanic electrical current.

Another object of the invention is to provide such a method to couple pipe which method provides the durability required to allow drilling and associated downhole tools to operate within the pipe string without compromising the integrity (tensile and compressive strength, hydrostatic resistance, etc.) necessary for satisfactory performance throughout the design lifetime of the well.

Another object of the invention is to provide a method to couple pipe with galvanic corrosion protection which offers increased resistance to "pull out" so as to enable the couple to support the pipe, tools and appliances that may be suspended below it in a subterranean well bore.

SUMMARY OF THE INVENTION

The pipe couple of the invention is used to protect two adjacent sections of pipe of dissimilar metals included in a string of pipe to be suspended from its upper end in a hostile well environment. The couple includes two generally aligned tubular elements of dissimilar metals, each of the dissimilar metals being electrolytically compatible with a respective one of the two adjacent sections of pipe being joined in the pipe string. One of the tubular elements making up the couple is formed of a more noble metal than the other respective tubular element. Each of the two tubular elements has an outer end which is threaded for connection with a respective one of the two adjacent sections of pipe in the pipe string, and an inner end for joining to the other respective tubular element to make up the couple. The tubular elements each have a generally cylindrical internal bore which extends for a given length between the outer and inner ends thereof. A non-conductive coating is uniformly applied along substantially the entire length of the internal bore of the tubular element formed of the more noble metal to eliminate the flow of galvanic induced electrical current between the more noble metal and the relatively less noble metal of the other respective tubular element making up the couple.

Preferably, the tubular element formed of the more noble metal has an externally threaded pin (male) connection at the inner end thereof and the tubular element formed of the less noble metal has an internally threaded box (female) connection at the inner end thereof which extends along an internal region thereof for matingly engaging the other respective tubular element. The non-conductive coating is applied along the entire length of the internal bore of the tubular element formed of the more noble metal. Preferably, the tubular elements making up the pipe couple are connected by a metal to metal seal threaded connection, which provides an oxygen free environment within the connection. The tubular element formed of the less noble metal can be formed of carbon steel and the tubular element formed of the more noble metal can be formed of any suitable CRA material. The preferred non-conductive coating applied to the internal bore of the tubular element formed of the more noble metal is an abrasion resistant epoxy ceramic coating.

In the method of applying the galvanic corrosion protection system of the invention, two generally aligned tubular elements of dissimilar metals are threadedly engaged to make up a couple by connecting the threaded inner ends thereof. Thereafter, the non-conductive coating is uniformly applied along substantially the entire length of the internal bore of the CRA element to eliminate the flow of galvanic induced electrical current between the CRA element and the more base metal element. The use of the CRA material in only selected lengths of pipe along the length of the pipe string extending to the well surface results in economy of manufacture and operation.

Additional objects, features and advantages will be apparent in the written description which follows.

BRIEF DESCRIPTION OF THE DRAWINGS

FIG. 1 is a side, partial cross-sectional view of the pin and box tubular elements of the pipe couple of the invention shown in exploded fashion;

FIG. 2 is a view similar to FIG. 1 but showing the mating threaded connection of the box and pin elements of the pipe couple of the invention;

FIG. 2a is a partial, close-up view of the threaded connection of the invention showing the coating applied thereto; and FIG. 3 is a perspective view of a portion of a well pipe string employing the pipe couple of the invention.

DETAILED DESCRIPTION OF THE INVENTION

FIG. 2 shows a pipe couple of the invention, designated generally as 11 for protecting two adjacent sections of pipe (13, 15 in FIG. 3) of dissimilar metals included in a string of pipe to be suspended from its upper end in a hostile well environment. The string of pipe might be utilized in an oil, gas, waste injection or other well environment in which the pipe string is subject to high differential fluid pressures and electrolytic fluids.

FIG. 1 shows the pipe couple 11 in exploded fashion including two generally aligned tubular elements 17, 19 of dissimilar metals, each of the dissimilar metals being electrolytically compatible with a respective one of the two adjacent sections of pipe 13, 15 (FIG. 3) being joined in the pipe string. In the embodiment of the invention illustrated in FIGS. 1 and 2, the lower tubular element 19 is comprised of the more noble metal while the upper tubular element 17 is comprised of the relatively less noble metal. While the present invention applies to the coupling of any two dissimilar metals where a galvanic couple is created leading to corrosion problems, the metals typically employed in a well pipe string would include carbon steel for the less noble member 17 and corrosion resistant alloy (CRA) for the more noble metal of element 19.

In addition to the typical configuration illustrated in FIG. 3, some waste injection well designs require multiple sections of CRA material separated by a less noble metal such as carbon steel. The pipe couple of the invention is adaptable to these applications, requiring only that the orientation of the pipe couple of the invention be consistent with the metal used for the adjacent sections of pipe.

Carbon steel is generally utilized in the upper portion of the well above the injection interval, in the case of a waste injection well, and the CRA is used for the lower portion of the pipe string from just above the packer to the base of the pipe string in the well. The connection of carbon steel to CRA creates a galvanic couple and the resulting galvanic reaction would normally accelerate corrosion of the carbon steel portion of the string adjacent the couple, leading to premature failure immediately adjacent the connection of the two dissimilar metals. Galvanic corrosion is halted, however, when the flow of electrical current from the cathode (CRA) to the anode (carbon steel) is eliminated.

The nature of the more noble, CRA material selected will depend upon the particular well environment encountered including the chemistry, temperature, injection pressure, etc. A tubular string design computer program is available from John Gandy Corporation of Conroe, Texas, to enable the well operator to design the optimum well pipe string taking into account the anticipated downhole environment. Such a pipe string will normally include lengths of standard carbon steel material as well as lengths of CPA material. Typical examples of CRA type materials include: (1) stainless steel; conventional austenitic, high alloy austenitic, martensitic, precipitation hardened, duplex and ferritic; (2) precipitation hardened and solid solution nickel-base alloys; nickel copper alloys; and (3) cobalt-base, titanium and zirconium alloys. This description of the general classification of CRA materials actually includes a myriad of material options, depending upon the well application under consideration, and is merely intended to be illustrative of suitable materials for use in practicing the invention.

As shown in FIG. 1, the upper tubular element 17 has an outer end 21 and an oppositely arranged inner end 23, both of which have internally threaded box connections 24, 26. The inner end 23 of the upper tubular element is designed to threadedly engage the mating threaded pin connection 25 at the inner end 27 of the lower tubular member, the lower tubular member also having an oppositely arranged threaded pin connection 31 at the outer end 29 thereof. The pin and box connections 24, 25 join the respective tubular elements making up the couple 11 while the box connection 26 and pin connection 31 mate to couple the two adjacent sections of pipe in the pipe string, as shown in FIG. 3. Each of the tubular elements 17, 19 also has a generally cylindrical internal bore 33, 35 which extends for a given length between the outer and inner ends thereof.

In order to form the pipe couple of the invention, the couple is assembled, as shown in FIG. 2, prior to inclusion in the pipe string which is subsequently located in the well bore. A wear-resistant, non-conductive coating is uniformly applied along substantially the entire length of the internal bore 35 of the tubular element 19 comprised of the more noble metal to eliminate the flow of galvanic induced electrical current from the more noble metal to the relatively less noble metal of the upper tubular element 17. Preferably, the non-conductive coating is applied along the entire internal bore of the lower tubular element 19 formed of the more noble metal, including the threaded end regions 25, 31 thereof. The uniformly applied non-conductive coating also extends within the internal bore 33 of the box connection of the upper tubular element 17 at least ¼ inch past the length of the threaded internal region thereof (see "w" in FIG. 2a). The coated region of the internal bores of the tubular elements 17, 19 is illustrated as "a" in FIG. 2 and extends generally to about ¼th inch past the CRA-carbon interface of the threaded connection between the coupled elements.

As shown in FIGS. 1 and 2, the upper and lower tubular elements 17, 19 are preferably joined by a threaded connection which constitutes a metal to metal seal which produces an oxygen-free environment within the connection. The resulting made up joint, shown in FIG. 2, has a generally cylindrical internal bore and a generally cylindrical exterior, without upset.

The preferred wear-resistant non-conductive coating is a ceramic epoxy coating commercially available from John Gandy Corporation of Conroe, Texas, as the JGC 2012 coating. The coating is extremely resistant to both mechanical abrasion and chemical attack. When applied to the appropriate length of a CRA pipe at and below the connection with carbon pipe, it eliminates the flow of galvanic induced electrical current from the CRA to the carbon steel section of pipe. The coating has a boiling range of 148 to 608° F., a specific gravity of 1.3, is soluble in water and has a flash point of 45° F. It is an opaque or clear dispersion and is supplied commercially as a two component product mix which has a pot life of approximately four hours at 77° F.

The method of the invention allows the connection of two sections of pipe of dissimilar metals while eliminating the occurrence of galvanic corrosion between the two sections of pipe. The first step in the assembly process is to machine the specialty connections on the tubular elements 17, 19 which, in the embodiment of FIG. 1, are a first length of CRA pipe 19 and a two foot long carbon steel crossover sub 17. Following the threading of the pin and box connections 24, 25, the upper and lower tubular elements 17, 19 are screwed together and bucked up at the threaders' facility. The entire assembly is then taken to the coating facility. The assembly (11 in FIG. 2) is baked at a temperature of 700° F. for one hour to remove any oil, grease or impurities on the interior surface of the CRA. The inside of the assembly is then grit blasted using a garnet blast media. Blasting is performed to achieve a NACE-1 (SSPC-SP5, Swedish-Sa 3) white metal finish, but no less than a NACE-2 (SSPC-SP10, Swedish-Sa 2.5) near white metal finish. The relief of the blasted anchor profile is between 1.5 and 2 mils in depth.

Following removal from the blast cabinet, the assembly is purged with dehydrated air to remove any abrasive material or dust and inspected for proper blast and anchor profile using a dial thickness gauge and an anchor profile tape.

Prior to the actual coating application, the interior of the upper carbon steel pipe element 17 is masked to within ¼th inch of the CPA/carbon interface to prevent coating of the carbon. A JGC2012 ceramic epoxy coating is then applied in a two-pass, spray application. Each pass applies a 4 to 5 mil spray coating of the ceramic epoxy material to provide a total dry film thickness of about 8 to 10 mils. The first pass is typically allowed to cure for a minimum of 24 hours to protect the integrity of the film before the second pass of coating is applied.

After both passes of the spray coating have been applied and the coating has cured completely (typically about 48 hours cure time), the coating is inspected visually for any imperfections such as runs and/or sags. The coating thickness is determined throughout the assembly using a Mikrotest DFG-300 dry film test gauge, or equivalent. Should the thickness of the interior coating be less than about 8 mils, the application process is repeated to achieve the required thickness.

FIG. 3 shows a typical pipe string arrangement of the type utilizing the pipe couple 11 of the invention. The distance "b" illustrates a section of carbon steel pipe leading to the well surface. The distance "c" is a two foot carbon steel crossover sub such as element 17 in FIG. 1. The length "d" illustrates a lower tubular element 19 having the JGC2012 ceramic epoxy coating on the interior thereof. The length "e" illustrates the CRA portion of the couple of the invention and the remaining corrosion resistant alloy to total depth.

The actual length of the ceramic epoxy coating within the internal bore 35 of the lower element 19 which extends above the threaded pin slightly into the interior bore 33 of the upper tubular element 17 can vary somewhat but is typically extended past the upper pin thread slightly with the length of the coating being about a minimum of 10 times the diameter of the pipe O.D.

An invention has been provided with several advantages. The pipe couple of the invention allows the connection of two sections of pipe formed of dissimilar metals while eliminating the occurrence of galvanic corrosion between the two sections of pipe. Unlike the prior art techniques utilizing a section of non-metallic pipe in the string, the pipe coupling of the invention does not detract from the strength of the pipe string as a whole and is not susceptible to being drilled out or pulled out during normal well operations. Also, the materials of the pipe couple of the invention allow it to be used in extremely electrolytic fluids. The relatively slim exterior profile of the pipe couple facilitates its use in well applications, allowing a smaller diameter hole to be drilled. The pipe couple of the invention prevents the galvanic corrosion which would otherwise decrease the life span and increase the maintenance costs associated with the use of dissimilar metals in a well environment.

While the invention has been shown in only one of its forms, it is not thus limited but is susceptible to various changes and modifications without departing from the spirit thereof.

What is claimed is:

1. A pipe couple for protecting two adjacent sections of pipe of dissimilar metals included in a string of pipe to be suspended from its upper end in a hostile well environment, the pipe string being subject to high differential fluid pressures and electrolytic fluids, the couple being assembled prior to inclusion in the string, the couple comprising:

two generally aligned tubular elements of dissimilar metals, each of the dissimilar metals being electrolytically compatible with a respective one of the two adjacent sections of pipe being joined in the pipe string, one of the tubular elements making up the pipe couple being of a more noble metal than the other respective tubular element which is formed of a relatively less noble metal;

each of the two tubular elements having an outer end which is threaded for connection with a respective one of the two adjacent sections of pipe in the pipe string, and an inner end for joining the other respective tubular element to make up the couple, each of the tubular elements also having a generally cylindrical internal bore which extends for a given length between the outer and inner ends thereof;

a nonconductive coating uniformly applied along substantially the entire length of the internal bore of the tubular element formed of the more noble metal and along less than the entire length of the internal bore of the tubular element formed of the relatively less noble metal to inhibit the flow of galvanic induced electrical current between the more noble metal and the relatively less noble metal of the other respective tubular element making up the couple; and wherein the tubular elements making up the pipe couple are connected by a metal to metal seal threaded connection which provides an oxygen free environment within the connection.

2. The pipe couple of claim 1, wherein the tubular element formed of the more noble metal has a threaded pin connection at the inner end thereof and wherein the tubular element formed of the less noble metal has a box threaded connection at the inner end thereof which extends along a threaded internal region for matingly engaging the other respective tubular element, and wherein the nonconductive coating applied along the internal bore of the tubular element formed of the more noble metal extends within the internal bore of the box connection along at least a length of the threaded internal region thereof.

3. The pipe couple of claim 2, wherein the tubular box element formed of the less noble element is formed of carbon steel and the tubular pin element formed of the more noble element is formed of CRA.

4. The pipe couple of claim 3, wherein the nonconductive coating applied to the internal bore of the tubular element formed of the more noble metal is an abrasion resistant epoxy ceramic coating.

5. A method for connecting two sections of pipe formed of two dissimilar metals while eliminating the occurrence of galvanic corrosion between the two sections of pipe, the method comprising the steps of:

providing two generally aligned tubular elements of dissimilar metals, each of the dissimilar metals being electrolytically compatible with a respective one of the two adjacent sections of pipe being joined together, one of the tubular elements making up the pipe couple being of a more noble metal than the other respective tubular element which is formed of a relatively less noble metal;

each of the two tubular elements used to form the couple having an outer end which is threaded for connection with a respective one of the two adjacent sections of pipe being joined, an inner end for joining the other respective tubular element to make up the couple, each of the tubular elements also having a generally cylindrical internal bore which extends for a given length between the outer and inner ends thereof;

making up the couple by threadedly connecting the inner ends of the tubular elements;

thereafter, uniformly applying a nonconductive coating along the entire length of the internal bore of the tubular element formed of the more noble metal and along less than the entire length of the internal bore of the tubular element formed of the relatively less noble metal to inhibit the flow of galvanic induced electrical current between the more noble metal and the relatively less noble metal of the other respective tubular element making up the couple; and wherein the tubular elements making up the pipe couple are connected by a metal to metal seal threaded connection which provides an oxygen free environment within the connection.

6. The method of claim 5, wherein the tubular element formed of the more noble metal is provided with a threaded pin connection at the inner end thereof and wherein the tubular element formed of the less noble metal is provided with a box threaded connection at the inner end thereof which extends along a threaded internal region for matingly engaging the other respective tubular element, and wherein the nonconductive coating applied along the internal bore of the tubular element formed of the more noble metal is applied to extend within the internal bore of the box connection along at least the threaded internal region thereof.

7. The method of claim 6, wherein the tubular element formed of the less noble element is formed of carbon steel and the tubular element formed of the more noble element is formed of CRA.

8. The method of claim 7, wherein the nonconductive coating applied to the internal bore of the tubular element formed of the more noble metal is an abrasion resistant epoxy ceramic coating.

* * * * *